J. H. HAMMOND, Jr.
APPARATUS FOR CONTROLLING TORPEDO FIRING.
APPLICATION FILED OCT. 5, 1915.
1,431,142.
Patented Oct. 3, 1922.
7 SHEETS—SHEET 1.
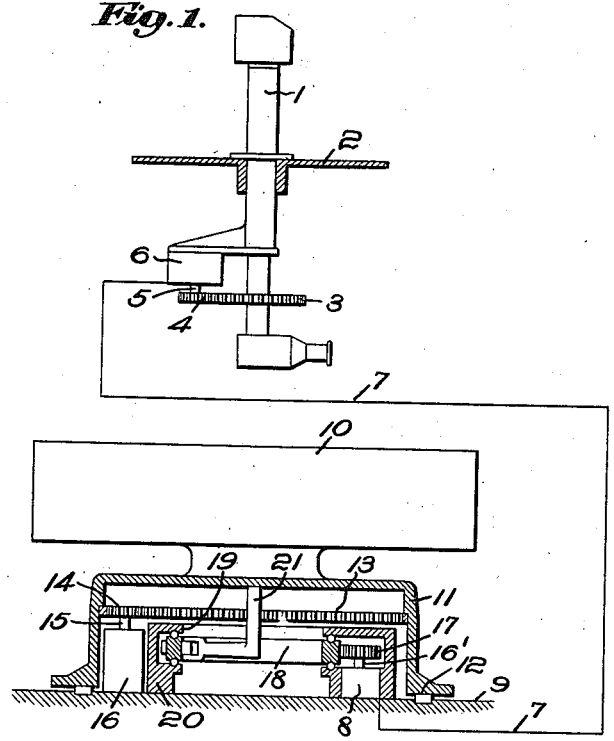
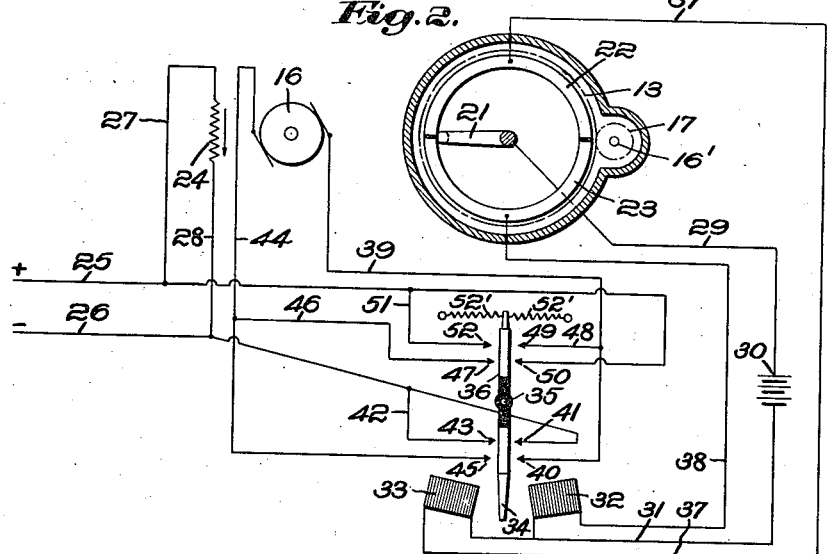
Inventor:
John Hays Hammond, Jr.
by Evarts, Booth, James and Vance
Attys.

J. H. HAMMOND, Jr.
APPARATUS FOR CONTROLLING TORPEDO FIRING.
APPLICATION FILED OCT. 5, 1915.

1,431,142.

Patented Oct. 3, 1922.
7 SHEETS—SHEET 2.

Inventor:
John Hays Hammond, Jr.
by Emery, Booth, Janney and Varney
Attys.

J. H. HAMMOND, Jr.
APPARATUS FOR CONTROLLING TORPEDO FIRING.
APPLICATION FILED OCT. 5, 1915.

1,431,142.

Patented Oct. 3, 1922.
7 SHEETS—SHEET 4.

Inventor:
John Hays Hammond, Jr.
Attys.

J. H. HAMMOND, Jr.
APPARATUS FOR CONTROLLING TORPEDO FIRING.
APPLICATION FILED OCT. 5, 1915.

1,431,142.

Patented Oct. 3, 1922.
7 SHEETS—SHEET 5.

Inventor:
John Hays Hammond, Jr.
by Emery Booth Janney and Varney
Attys.

J. H. HAMMOND, Jr.
APPARATUS FOR CONTROLLING TORPEDO FIRING.
APPLICATION FILED OCT. 5, 1915.
1,431,142.
Patented Oct. 3, 1922.
7 SHEETS—SHEET 6.
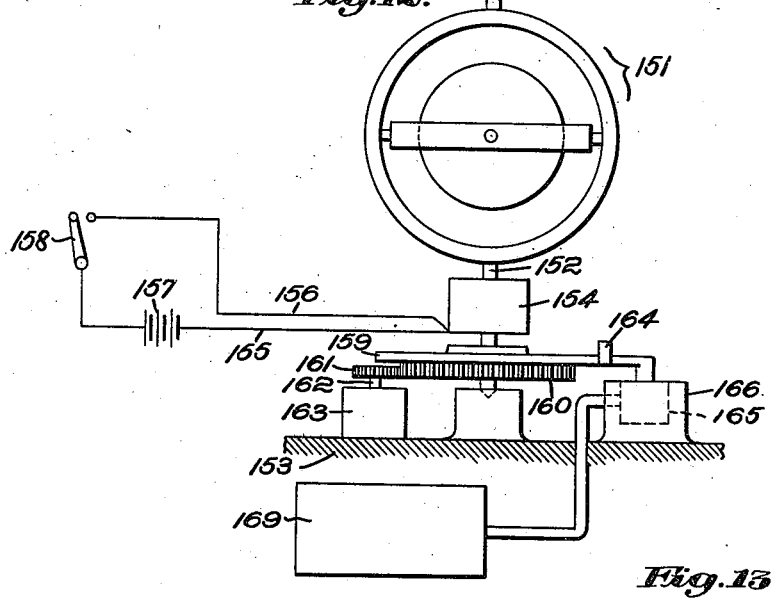
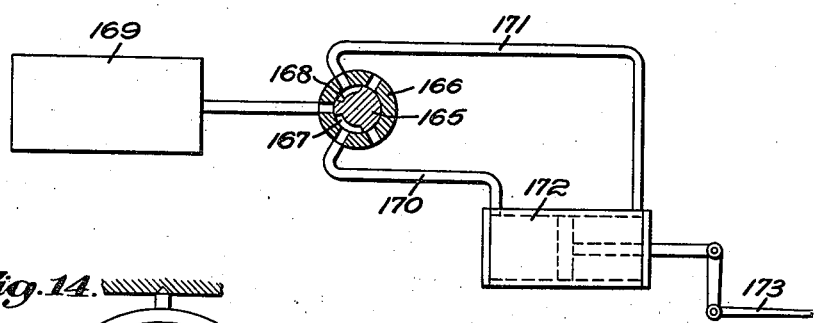
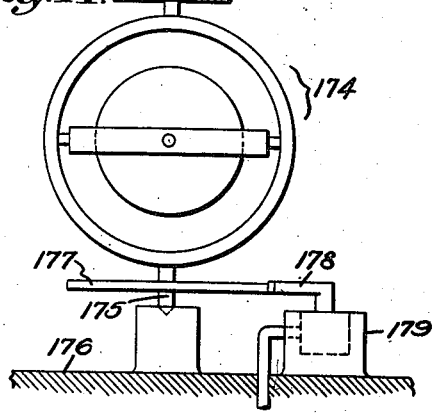
Inventor:
John Hays Hammond, Jr.
by Emery, Booth, Janney and Varney
Attys.

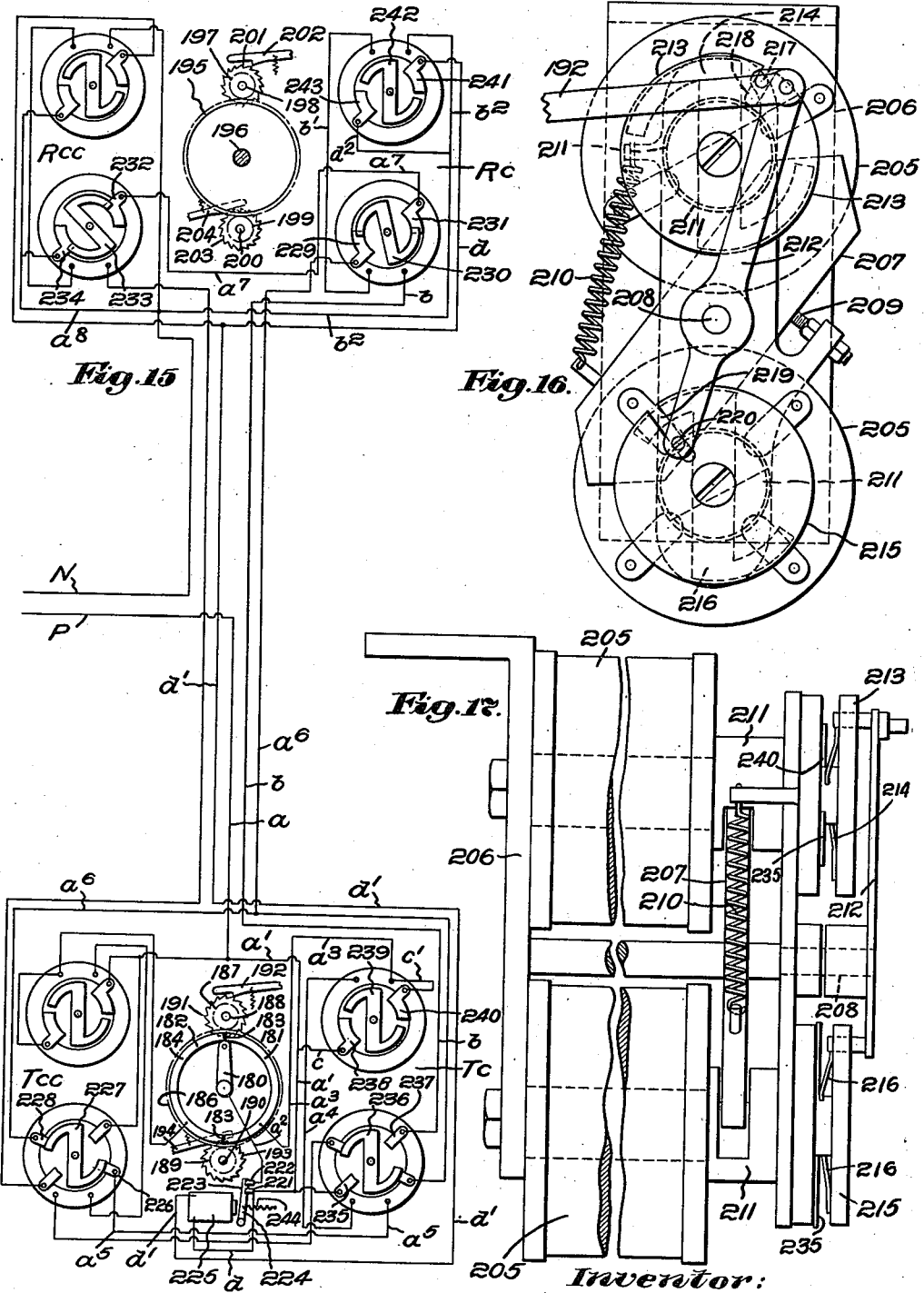

Patented Oct. 3, 1922.

1,431,142

UNITED STATES PATENT OFFICE.

JOHN HAYS HAMMOND, JR., OF GLOUCESTER, MASSACHUSETTS.

APPARATUS FOR CONTROLLING TORPEDO FIRING.

Application filed October 5, 1915. Serial No. 54,264.

*To all whom it may concern:*

Be it known that I, JOHN HAYS HAMMOND, Jr., a citizen of the United States, and a resident of Gloucester, in the county of Essex and State of Massachusetts, have invented an Improvement in Apparatus for Controlling Torpedo Firing, of which the following description, in connection with the accompanying drawings, is a specification, like characters on the drawings representing like parts.

This invention relates to apparatus for controlling torpedo firing and in certain aspects thereof is an improvement upon the construction shown in my co-pending application Serial No. 43,879. In order that the principle of the invention may be readily understood, I have disclosed certain embodiments thereof in the accompanying drawings, wherein—

Fig. 1 is a view largely diagrammatic and partially in side elevation and partially in vertical section of one form of means for practicing my invention;

Fig. 2 is a view partially in plan of the structure shown in Fig. 1 and partially diagrammatic with respect to electrical connections not represented in Fig 1;

Fig. 12 is a view partially in vertical section and partially diagrammatic of still another form of my invention;

Fig. 13 is a view in plan representing certain of the fluid connections employed with that type of my invention shown in Fig. 12; and Fig. 14 is a view partially in vertical section and partially diagrammatic of still another form of my invention.

Fig. 15 is a plan showing step-by-step transmitting and repeating devices for producing a movement of the torpedo carrier or other directing means or direction-maintaining means therefor, corresponding to the orientation of the periscope or other sighting instrumentality;

Fig. 16 is a front elevation of a step-by-step mechanism shown diagrammatically in Fig. 15; and Fig. 17 is a side elevation of the mechanism shown in Fig. 16.

Figure 3:
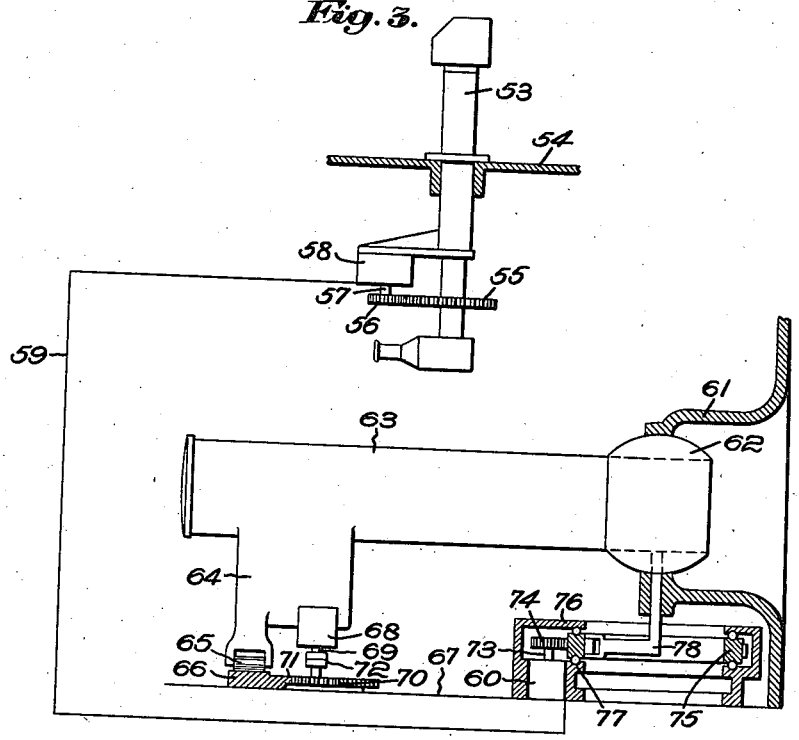
Fig. 3 is a side elevation of another form of my invention.

Prior to my invention disclosed in the application above referred to, the firing of torpedoes from fixed tubes in moving vessels has been a matter of very considerable difficulty, particularly in submarine work. Such tubes being usually an integral part of the hull of a submarine or other vessel, it has been necessary in such cases to train the longitudinal axis of the submarine in the direction of the target. In order to use the bow tubes, the submarine is forced to advance head-on to the target and thus is frequently placed in a disadvantageous tactical position. Moreover, heretofore only certain tubes could be fired at a time, and this necessitated the carrying out of certain maneuvers by the submarine.

In said prior application, I have disclosed means whereby through a centralized control and preferably through the sighting instrumentality the direction-maintaining means of the torpedo or torpedoes may be acted upon or modified as to cause the discharged torpedo or torpedoes to travel toward and to strike the target upon which the sighting instrumentality is trained.

In this application I have disclosed certain forms of means whereby through a centralized control and preferably through the orientation of the sighting instrumentality the torpedo tube or carrier is synchronously moved thereby to train said tube or carrier upon the target or in such manner with respect thereto (if the target be a moving one) that the torpedo when discharged will strike the target.

In accordance with my invention I may employ one torpedo tube or a plurality thereof and in the event of employing a plurality of such tubes they may be positioned as a unit or upon different parts of the ship, as, for example, at the bow, at the stern, and amidship. In the event of employing a plurality of torpedo tubes, I may and preferably do employ means for effecting divergence or convergence of the paths of travel of the torpedoes discharged from said tubes. In the event of employing a plurality of tubes located upon different portions of the ship or other basal support, I preferably provide means whereby the tubes themselves may be so moved through the sighting instrumentality of centralized control as to obtain convergence or divergence of the paths of travel of the torpedo. In the event of employing a plurality of torpedo tubes as a unit, I preferably provide means whereby through the orientation of the sighting instrumentality of centralized control the direction-maintaining means of the several torpedoes are themselves so modified or acted upon as to obtain convergence or divergence of the paths of travel of said torpedoes. Both these principles of operation are within the broad scope and purpose of the invention.

The centralized control may be of any suitable character and in the present application is typified by a sighting apparatus or device which may be a periscope, telescope, a projector controlled mechanically, electrically or otherwise, or any other mechanism preferably involving the use of the visual sense. In certain cases an indicating dial may be employed, with relation to which the sighting apparatus or other control may be manipulated.

In the ensuing description I shall refer to a vessel as carrying a torpedo or torpedoes. It is, however, to be understood that within the scope and purpose of my invention I may employ any suitable basal support for the torpedo or torpedoes, and that therefore such terms of description are not limiting designations.

Referring first to the form of my invention shown in Figs. 1 and 2, I have therein indicated at 1 a periscope constituting one form of sighting instrumentality. In the disclosed embodiment of the invention, the apparatus is therefore mounted upon a submarine but it is in nowise limited to such application, and I desire it to be understood that I may readily employ the apparatus shown in Figs. 1 and 2 upon a non-submersible vessel, in which case I would preferably substitute a telescope for the periscope 1.

The periscope or other sighting instrumentality 1 is mounted for rotation upon a vertical axis in the roof of the conning tower, a portion of which is indicated at 2. Fast upon the tubular portion of the periscope within the conning tower is a gear 3 meshing with a pinion 4 upon the shaft 5 of a suitable transmitter 6 electrically connected by suitable conductors diagrammatically indicated at 7. Said conductors 7 extend to a repeater 8 mounted upon or in suitable relation to the deck of the vessel indicated at 9.

Upon the deck of the vessel is mounted a torpedo tube 10, it being herein shown as provided with a rotatable support 11 between which and the deck 9 are provided ball or roller bearings 12 to facilitate the turning movement of the tube 10.

Formed upon or secured to the inner surface of the support 11 is an internal gear 13 meshing with which is a pinion 14 upon the shaft 15 of a motor 16 which may be of any suitable type, but which is preferably a shunt electrical motor.

The repeater 8 is provided with a shaft 16' having a pinion 17 meshing with an annular gear formed upon or carried by an azimuth ring 18, which may be of the character disclosed in my co-pending applications Serial Nos. 43,879, 50,718 and 50,719. Said azimuth ring 18 is therefore synchronized in movement with the orientation of the periscope or other sighting instrumentality 1.

The said azimuth ring is mounted upon the deck and preferably in brackets 19, 20 positioned above and below the same and in connection with which may be provided suitable ball bearings.

Depending from an interior portion of the support 11 or from the torpedo tube 10 is a contact arm 21 which may be similar to any of those shown in my said co-pending applications. While the motor 16 may be of any suitable construction, it is preferably one in which the armature and field windings thereof are separate, so that the direction of rotation may easily be changed. Said motor 16 is connected by suitable wiring to the contact arm 21 and the azimuth ring 18, and the purpose thereof is to cause the said contact arm to follow the azimuth ring in the orientation of the latter in synchronism with that of the periscope 1. Inasmuch as the contact arm is carried by the torpedo tube 10 or rotatable support therefor, it results that the orientation of the periscope or other sighting instrumentality cause a synchronizing movement of the torpedo tube 10.

As set forth in my co-pending application Serial No. 50,718, when the azimuth ring 18 moves out of alignment with the contact arm 21, the said arm makes contact with segment 22 or 23, as the case may be, on the azimuth ring 18, thereby to energize a suitable circuit, which causes the motor 16 so to operate that the contact arm 21 is caused to move into alignment with the azimuth ring 18. If the said azimuth ring 18 moves in the other direction, the rotation of the motor 16 is reversed.

While this result may be secured by any suitable electrical connection, I have in Fig. 2 diagrammatically indicated one form of electrical connection for this purpose. Therein I have diagrammatically indicated the motor at 16 and the field winding therefor at 24. At 25 and 26, I have diagrammatically indicated two direct current supplies and have represented conductors 27 and 28 leading to and from the said field winding 24. Leading from the pivot of the contact arm 21 is a conductor 29 extending to a battery 30, from which leads a conductor 31 electrically connected to solenoids 32, 33, between which is mounted a switch 34 pivoted at 35, and having an insulating portion 36 between its contact ends. Leading from the segment 22 of the azimuth ring 18 is a conductor 37 extending to the solenoid 33 and leading from the segment 23 of the azimuth ring is a conductor 38 leading to the solenoid 32. Leading from the motor 16 is a conductor 39 extending to a point in proximity to the switch 34 where it is provided with a contact terminal 40. The conductor 26 of the direct current supply extends to a point in proximity to the switch 34 where it is provided with a contact terminal 41, and is provided with a branch 42 leading to a point adjacent the opposite side of the switch 34 where it is provided with a contact terminal 43. Extending from the motor 16 is a conductor 44 extending to a point in proximity to the switch 34 where it is provided with a contact terminal 45. The said conductor 44 is also branched to provide a conductor 46 terminating in a conductor 47 in proximity to the upper end of the switch 34. The conductor 39 extending from the motor 16 is also branched to provide a conductor 48 terminating in a contact 49 in proximity to the upper end of the switch 34. The conductor 25 of the direct current supply extends to a point in proximity to the upper end of the switch 34 where it terminates in a contact 50, said conductor 25 being branched as indicated at 51 to provide a contact terminal 52 in proximity to said switch 34. The construction and mode of operation are such that when the contact arm 21 makes contact with the segment 22 of the azimuth ring 18, the solenoid 33 is energized through the conductor 37, thereby attracting the switch 34 which closes the circuit through the contacts 43, 45, thus causing the current to travel to the armature winding of the motor 16 in one direction, the circuit being at the same time also closed through the terminals 49, 50. Thereupon the contact arm is caused to follow the azimuth ring. If, however, the azimuth ring be turned in the opposite direction, the contact arm 21 makes contact with the segment 23 thereof, and through the conductor 38 the solenoid 32 is energized, thereby swinging the switch 34 in the opposite direction, thereby closing the circuit through the terminals 40, 41 and 47, 52, thereby reversing the direction of the current in the armature winding of the motor 16, which causes the contact arm 21 to move in the other direction.

The switch 34 is provided with springs 52′ which cause it to assume a central position when the contact arm 21 is on the insulation between the segments 22 and 23.

Figure 4:
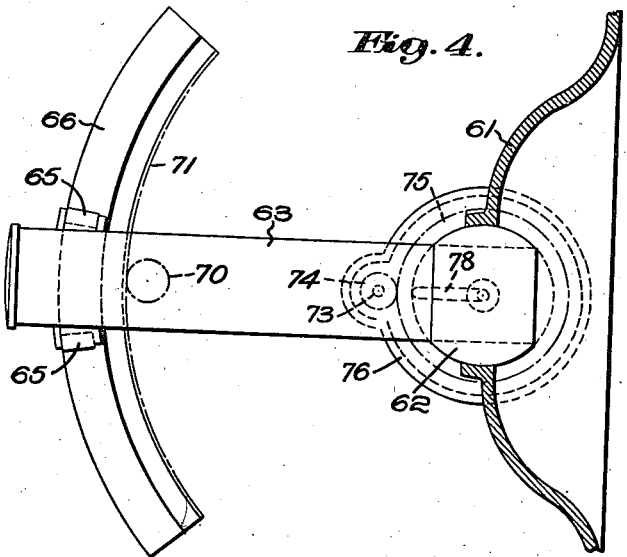
Fig. 4 is a plan view of the apparatus shown in Fig. 3.

In Figs 3 and 4, I have shown another form of my invention which may be employed upon any suitable support and which if employed upon a vessel may be applied to either a submersible or a non-submersible. I have, however, represented it as applied to a submarine.

In Fig. 3, the periscope is indicated at 53, it being mounted for rotation upon its vertical axis in the conning tower, a portion of which is indicated at 54. The said periscope or other sighting instrumentality has fast upon its tubular portion a gear 55 with which meshes a pinion 56 upon a shaft 57 of a transmitter 58 which is electrically connected by a conductor diagrammatically indicated at 59 with a repeater 60.

The vessel is provided in some suitable upright portion of its structure with a casing or support 61 having suitably mounted therein for swinging movement an annular member 62, the surface of which is spherical, receiving therein the outer end of a torpedo tube 63, the construction being such that both the torpedo tube 63 and the annular member 62 may be swung about a vertical axis in the casing or support 61. Water may be prevented from entering the torpedo tube 63 while the same is being loaded by any suitable means not herein shown, which may be similar in construction to that used at present on torpedo tubes. At its inner end, the said torpedo tube is provided with a foot or support 64 preferably provided with roller or ball bearings 65 adapted to ride upon a segmental track 66 upon the deck 67. The support 64 carries a motor 68 which may be similar in construction and mode of operation to the motor 16, Figs. 1 and 2. The shaft 69 of said motor is provided with a pinion 70 meshing with a segmental rack 71 upon the inner face of the track 66, whereby upon rotation of said motor 68 the torpedo tube may be swung to the right or to the left along said track 66. Preferably I provide the shaft 69 with a clutch 72 which may be disengaged automatically or by hand so as to permit the torpedo tube 63 to swing freely after the gyroscope of the torpedo has been brought up to speed and is free in space, and while the torpedo is leaving the tube.

The repeater 60 is provided with a shaft 73 having a pinion 74 meshing with a gear upon the azimuth ring 75 which may be and preferably is similar to the corresponding part shown in Figs 1 and 2, and which is herein supported for turning movement between brackets 76, 77, ball bearings being provided to facilitate the turning movement thereof.

The construction of parts is such that upon orientation of the periscope 53 the azimuth ring 75 rotates in synchronism therewith in a manner not herein necessary more fully to set forth. Depending from the torpedo tube 63 or the support 62 is a contact arm 78 which functions with the azimuth ring in the manner fully set forth in connection with Figs. 1 and 2, so as to drive the electric motor 68 in one direction or the other, thereby to swing the torpedo tube 63 in synchronism with the orientation of the periscope or other sighting instrumentality 53. I have not herein represented the electrical connections between the contact arm 78, the azimuth ring 75 and electric motor 68, but they may be similar to those shown in Fig. 2 or any other suitable connections may be provided for the purpose.

In connection with the several types or forms of my invention shown in this application, I may employ any one of the various systems or apparatus shown in my co-pending application Serial Nos. 50,718 and 50,719. Particularly I may in connection with the several forms of my invention herein shown employ means to indicate the range of the hostile vessel or other target. I may also employ means to correct for the various factors involved in torpedo firing and including the speed of the torpedo and the course and speed of the enemy's ship.

Referring more particularly to my co-pending application Serial No. 50,719 and to the structure shown in Fig. 1 thereof, I may utilize said structure as it is therein shown by connecting the conductors 9, 10 and 30 to the repeater, such as the repeater 8 of Fig. 1, herein a plurality of such repeaters being employed for a plurality of torpedo tubes. In such case the conductors 9, 10 and 30 would be connected to said plurality of repeaters 8 instead of to the repeaters of the torpedoes as in said application Serial No. 50,719.

I may also employ the apparatus or system shown in Fig. 3 of said application Serial No. 50,719 by connecting the conductors 86, 87 and 54' to a series of repeaters 8 functioning as shown in Fig. 1 of this application or corresponding repeaters shown in other forms of my invention in this application instead of to the torpedoes A, B, C. In this manner a series of torpedo tubes may be caused to move in synchronism with the orientation of the sighting instrumentality and in such connection I may if desired employ some independent instrument or mechanism to determine the range of the hostile vessel or other target.

Figure 5:
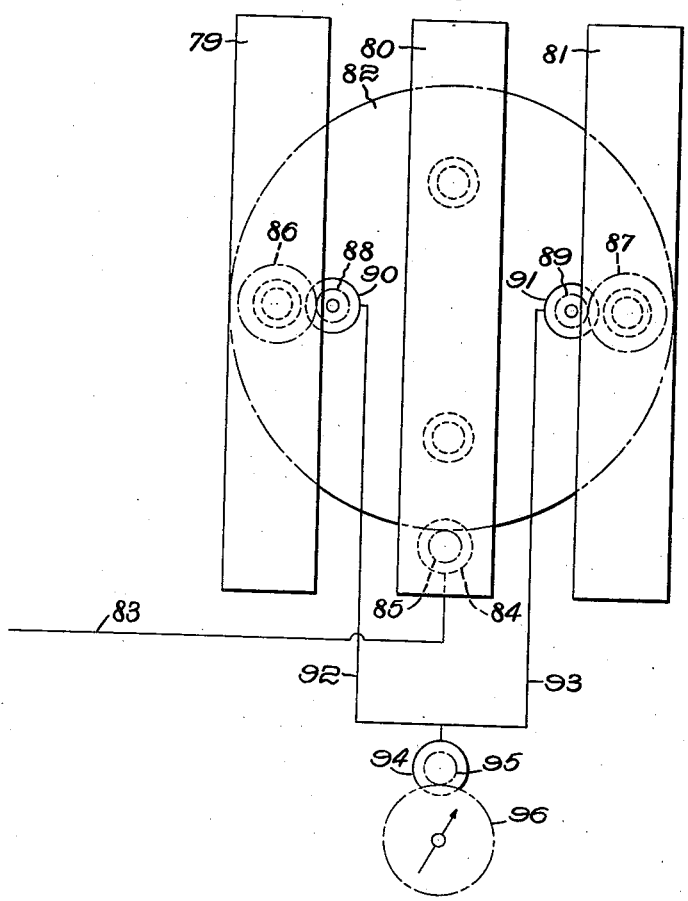
Fig. 5 is a view partially in plan and partially diagrammatic of still another form of my invention.
Figure 6:
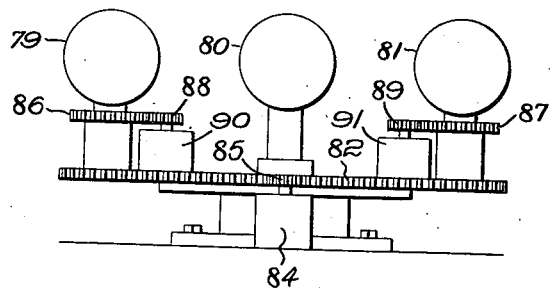
Fig. 6 is a front elevation of the structure shown in Fig. 5.
Figure 7:
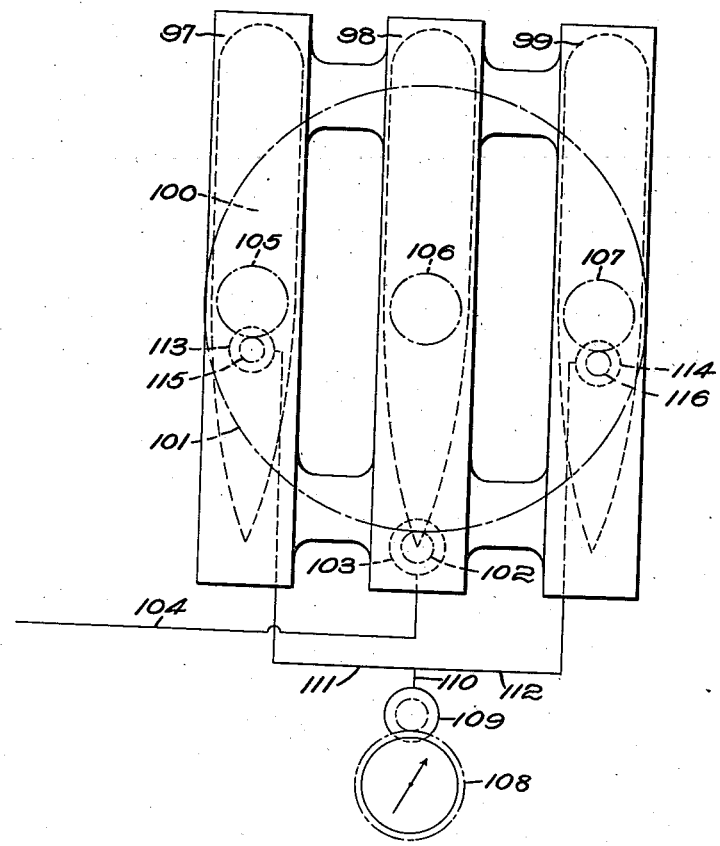
Fig. 7 is a view partially in plan and partially diagrammatic of still another form of my invention.
Figure 8:
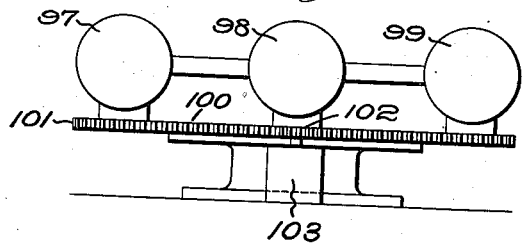
Fig. 8 is a front elevation of the structure shown in Fig. 7.

Referring to that type of my invention shown in Figs. 7 and 8 of my said co-pending application Serial No. 50,719, I may employ means similar or analogous to what is therein shown, but connected to a plurality of torpedo tubes of a single unit but movable independently of each other, instead of connecting such means to the gyroscopes of the torpedoes. To this end, I have in Fig. 5 represented another form of my invention, wherein I have represented three torpedo tubes 79, 80, 81, which are mounted as a unit upon a base or platform 82, the torpedo tube 80 being rigidly mounted thereon and the torpedo tubes 79 and 81 being so mounted thereon that they may be turned toward or from each other, thereby to obtain convergence or divergence of the paths of travel of the torpedoes discharged therefrom. In said figure, I have represented a conductor or series of conductors 83 which may be the same as the conductor 7 of Fig. 1 leading to the repeater 8, or may be the same as the conductor 59 of Figs. 3 and 4 leading to the repeater 60. The said conductor 83 leads from a suitable transmitter controlled by the sighting instrumentality or other centralized control to a repeater 84 having a pinion 85 meshing with a suitable gear upon the periphery of the platform 82, whereby the latter is turned in synchronism with the orientation of the sighting apparatus, thereby to turn the torpedo tube 80 in the same direction as the sighting instrumentality or in parallelism therewith.

In order to effect convergence or divergence of the torpedo tubes 79 and 81 and hence of the paths of travel of the torpedoes discharged therefrom, I provide the pivotal supports of said torpedoes 79, 81 with gears 86, 87 with which mesh pinions 88, 89 of repeaters 90, 91 operatively connected by electrical conductors 92, 93 with a transmitter 94, the gear 95 whereof is suitably controlled by a dispersion dial 96, which may be similar in function to the dispersion dial shown in my said co-pending application Serial No. 50,719.

In this manner or in any other suitable way, I may effect convergence or divergence of a plurality of torpedo tubes. It is not essential that the torpedo tubes which are so turned as to effect divergence or convergence thereof pertain to a single unit, as, if desired, they may be upon different parts of the ship or other basal support. In such latter case, however, I preferably modify the action of the gyroscopes of such separated torpedoes instead of moving the torpedo tubes and in such manner effect convergence or divergence of the paths of travel of the discharged torpedoes.

It will be evident that the gears of the repeaters 90, 91 are so arranged that they turn the gears 86, 87 of the torpedo tubes 79, 81 in opposite directions, thereby to effect such convergence or divergence.

Figure 10:
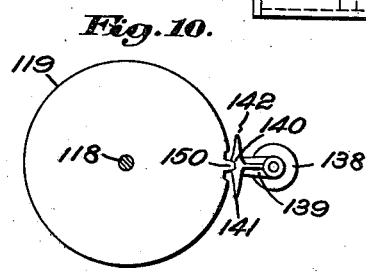
Fig. 10 is a plan view of the disk and co-operating pawl shown in Fig. 9.
Figure 11:
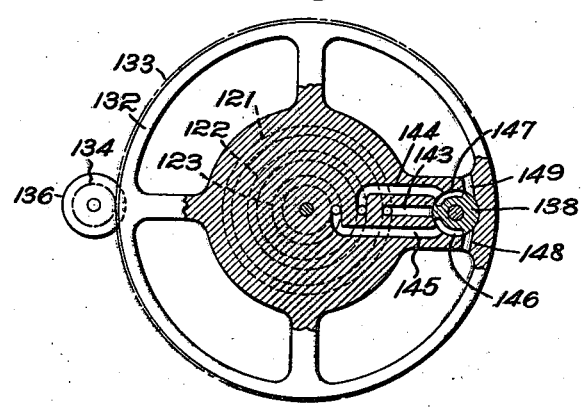
Fig. 11 is a similar view of the gear ring and co-acting parts shown in Fig. 9.

Referring again to my said copending application Serial No. 50,719, it is evident that the system represented in Figs. 10 and 11 of said application may be applied to and used in connection with my present invention, so as to synchronize the movement of a torpedo tube with the orientation of the sighting instrumentality instead of in said application, synchronizing the movement of some element of the torpedo itself. This may be accomplished by using substantially the mechanism shown in said Figure 10, but causing the conductor 215 to extend to a repeater operatively connected with a torpedo tube, as shown in any of the forms of my invention represented in this application, instead of causing said conductor 215 to extend to a repeater connected to an element of a torpedo itself, such as for example the torpedo A shown in said Fig. 10. In a similar manner I may use the system shown in Fig. 10 in connection with a plurality of torpedo tubes.

By using the system shown in said Fig. 10, it will be evident that I may correct or modify the orientation of the torpedo tube or torpedo tubes in view of the various factors involved, such for example as the torpedo's speed, the enemy's course and the enemy's speed.

I may employ the system shown in Figs. 16 and 17 of my said application Serial No. 50,719 in connection with the several forms of my present invention by connecting the conductors 303, 304 and 276 to repeaters themselves connected to torpedo tubes instead of to elements of the torpedo or torpedoes, thereby to effect orientation of the torpedo tubes in synchronism with that of the sighting instrumentality.

Similarly, I may employ the system represented in Figs. 20 and 21 of my said copending application Serial No. 50,719 in connection with the several forms of my invention shown in the present application, by extending the conductors 242, 243 to repeaters operatively associated with torpedo tubes instead of to repeaters operatively associated with elements of the torpedo. Such form of my invention is preferably employed where two torpedo tubes are positioned near together, but are structurally separate.

In Figs. 7 and 8, I have shown still another form of my invention. Therein I have shown a plurality of torpedo tubes, herein three in number 97, 98, 99 rigidly mounted upon a rotatable disk-like support 100. Said support is provided upon its periphery with a gear 101 with which meshes a pinion 102 of a repeater 103 which is connected by electrical conductors diagrammatically indicated at 104 with the transmitter itself operatively related to the sighting instrumentality, as fully illustrated and described with respect to Figs. 1 to 4 inclusive. By the described construction the support 100 is rotated in synchronism with the orientation of the sighting instrumentality. In addition thereto I provide means to modify or control the action of the direction-maintaining means of the torpedoes to be fired from said tubes 97, 98, 99. For this purpose I preferably provide the torpedoes with gyroscopes, the azimuth rings whereof are diagrammatically indicated at 105, 106, 107. I have represented a dispersion dial at 108 in Fig. 7 and have indicated a transmitter 109 as in mesh therewith or otherwise suitably controlled thereby. Leading from said transmitter is an electrical conductor 110 having branches 111, 112 extending to repeaters 113, 114, pinions 115, 116 whereof are in mesh with suitable gears upon the azimuth rings 105, 107. In this manner, I may by setting the dispersion dial 108 modify the action of the gyroscopes of the torpedoes contained in the torpedo tubes 97, 99, so that when said torpedoes are discharged they travel in paths that converge or diverge with respect to the path traveled by the torpedo discharged from the tube 98. The repeaters 113, 114 are so related to the azimuth rings 105, 107 that they tend to turn them in opposite directions so as to secure such convergence or divergence.

It will be observed that in this form of my invention I provide means for synchronizing the movement of a torpedo tube or torpedo tubes with the movement of the sighting instrumentality, and I also provide means to modify or control the direction-maintaining means of the torpedoes. While I have represented this latter function as effected through a dispersion dial, it is evident that it may be effected in any other suitable manner. It will furthermore be evident that the degree of convergence or divergence is calculated as set forth in my said co-pending application.

Figure 9:
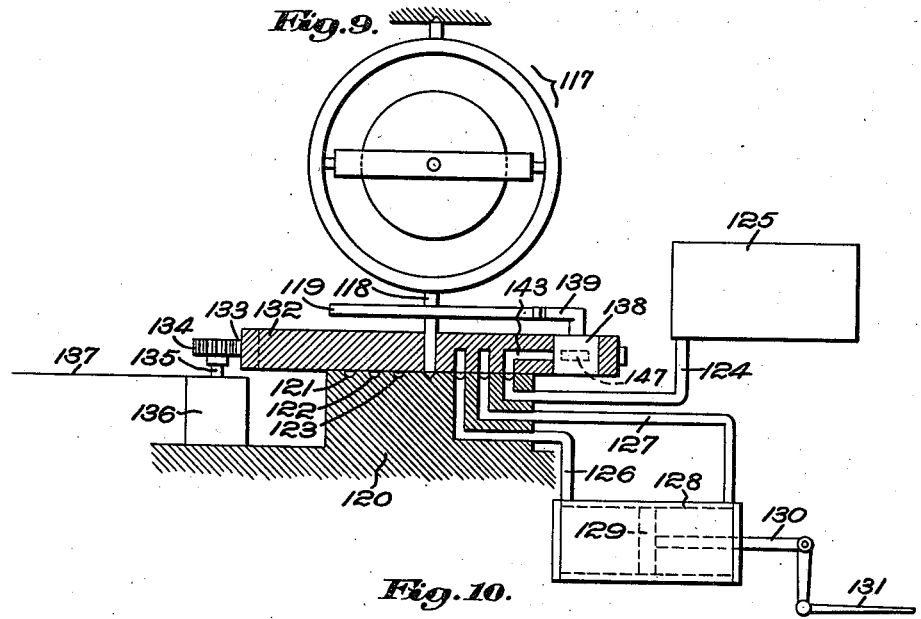
Fig. 9 is a view partially in vertical section and partially diagrammatic of another form of my invention.

In Figs. 9, 10 and 11 I have represented still another form of my invention, and one which if desired may be used in connection with the dispersion dial of the character represented in Fig. 7, but which may be otherwise employed. The form of my invention shown in Figs. 9, 10 and 11 may be employed in place of any of the forms or types of my invention shown in my copending application Serial No. 50,718.

In said figures I have diagrammatically indicated the gyroscope at 117, it being mounted in the torpedo and constituting direction-maintaining means therefor. The said gyroscope is held fixed with respect to the torpedo until the discharge of the latter, and is then freed therefrom in any suitable manner not herein necessary to disclose, and for example in any of the ways shown in my said co-pending applications. The outer gimbal ring of said gyroscope has fast upon its spindle 118 a disk 119, which therefore is held fixed in space after the torpedo is discharged. The hull of the vessel is indicated at 120, it being provided with a plurality of concentric passages 121, 122, 123, the outermost 121 of which is in communication by a supply pipe 124 with a source 125 of air under pressure or other suitable motive fluid. The passages 122, 123 are in communication by pipes 127, 126 respectively with the opposite ends of the steering cylinder 128 of the torpedo. Within said cylinder is positioned a piston 129 connected by piston rod 130, to the rudder 131. The spindle 118 of the gimbal ring is supported for rotation in the hull 120 of the vessel, and supported upon the hull of the vessel and for rotative movement about said spindle 118 is a gear ring 132 provided upon its periphery with a gear 133 with which meshes a pinion 134 upon the shaft 135 of a repeater 136 connected by electrical conductors diagrammatically indicated at 137 with a dispersion dial such as indicated in Fig. 7, or with the sighting instrumentality, whereby the said gear ring 132 is turned in synchronism with said sighting means in the opposite direction and to an equal extent. The said gear ring 132 corresponds generally in function to the azimuth ring shown in certain other forms of my invention.

The said gear ring 132 has mounted in the frame thereof a valve 138 in such manner that it may rotate in said frame. The said valve 138 is provided with a pawl-like arm 139 which as shown most clearly in Fig. 10 is provided with a notch or recess 140 and with opposite wings or projections 141, 142. The said gear ring 132 is provided with three passages 143, 144, 145, which are in communication respectively with the concentric passages 121, 122, 123 in the hull of the vessel, so that communication is established between the respective passages, whatever be the movement of rotation of the gear ring 132. The passage 143 is in communication at all times with the supply passage 124.

The said valve 138 is provided with passages 146, 147 adapted to be placed in communication respectively with the passages 143, 145, and the passages 143, 144. Said passages 146, 147 may also be placed in communication with exhaust ports 148, 149.

Through the action of the repeater 136, the gear ring 132 is turned in synchronism with the sighting instrumentality, but in an opposite direction and to an equal extent. If desired, however, I may through a dispersion dial or otherwise so modify the movement of the gear ring 132 that its position may be in conformity with any desired degree of dispersion.

The disk 119 is held fixed in space by the gyroscope upon discharge of the torpedo. If the torpedo tends to move off its course established by the gyroscope, the disk 119 which is provided with a tooth 150, moves the pawl 139 to the right or to the left as the case may be, thus turning the valve 138 and admitting motive fluid from the passages 124, 143 to either the passage 144 or 145, and thence through the passages 127 or 126 to the steering cylinder 128. Thereupon the rudder is turned to starboard or to port and the pawl 139, being carried by the ring 132 and the latter being fixed to the hull of the torpedo after the discharge thereof by reason of the friction in the repeater 136, is moved through the functioning of the disk 119, so as to bring the torpedo back to its course.

If the repeater 136 is connected to a sighting instrumentality, the gear 132 is moved in an opposite direction and to an equal extent. This causes the gear 132 to be moved to one side or the other of the tooth 150 which causes it to turn the valve 138 so that when the torpedo is started and air is admitted from tank 125, it will so operate the steering mechanism as to bring the torpedo into line with the sighting instrumentality.

The construction shown in said Figs. 9, 10 and 11 may be employed and preferably is employed to control the path of the torpedo upon and after its discharge from the tube, but such construction may be adapted to control the movement of a torpedo carrier.

I have previously stated that the gear ring 132 shown in Figs. 9 and 11 corresponds to function to the azimuth ring shown in my co-pending applications Serial Nos. 50,718 and 50,719. In that form of the invention shown in Figs. 9, 10 and 11, said gear ring corresponding as stated to the azimuth ring is moved in synchronism with the sighting means but in an opposite direction and to the same extent. In analogy to forms of my invention shown in said application Serial No. 50,718, I may hold the ring 132 stationary and move the disk 119 by making said disk free from the gyroscope and clutching it to the latter when the torpedo is discharged or I may hold the gear ring 132 stationary and move both the disk 119 and the gyroscope 117. Other combinations may obviously be made analogous to the various forms of my invention shown in said co-pending application Serial No. 50,718.

In Figs. 12 and 13, I have represented a form of my invention wherein the gear ring and the disk are free from the gyroscope but clutched thereto when the torpedo is discharged.

In said figures I have represented the gyroscope at 151, it being held fixed with respect to the torpedo until the discharge of the latter, whereupon it is freed therefrom in any suitable manner, as, for example, in any of the ways set forth in my said co-pending application. The spindle 152 of the outer gimbal ring is mounted in the hull of the torpedo indicated at 153 and has fast thereon a solenoid 154 adapted to be energized upon the discharge of the torpedo from its carrier in a manner not herein necessary fully to disclose. For this purpose it is in circuit with conductors 155, 156 and a battery 157, an automatically controlled switch 158 being provided which is moved to close the circuit upon the discharge of the torpedo. Loosely mounted for rotation upon the spindle 152 of the gyroscope is a disk 159 corresponding in general function to the disk shown in Figs. 9, 10 and 11, and fast to said disk is a gear ring 160 meshing with which is a pinion 161 upon the shaft 162 of a repeater 163. The said repeater is electrically connected as set forth in other forms of my invention with a transmitter operatively associated with the sighting means, whereby the said gear 160 may be synchronized in movement with the orientation of the sighting means. The adjacent faces of the solenoid 154 and the disk 159 are provided with clutching formations, whereby upon energization of the solenoid 152 the disk 159 and its gear 160 become fixed with respect to the gyroscope, the whole being lifted so that the gear 160 is disengaged from the pinion 161, thus leaving the gyroscope free in space.

Co-acting with the disk 159 is a pawl 164 corresponding in function to and preferably of the same construction as the corresponding pawl shown in Figs. 9, 10 and 11. The said pawl 164 is carried by a valve 165 which is similar in function to that shown in Figs. 9, 10 and 11, but which is here represented as mounted upon a portion 166 of the framing of the torpedo. The said valve is provided with passages 167, 168, by which the source of fluid under pressure 169 may be placed in communication with the pipes 170, 171, and hence with the steering cylinder 172, so as to turn the rudder 173 in the proper direction.

Inasmuch as I have fully set forth in connection with Figs. 9, 10 and 11, the mode of operation of such form of my invention, it is unnecessary more fully to set forth the same in connection with that modification thereof shown in Figs. 12 and 13.

In Fig. 14, I have shown a still further modification of that type of my invention represented in Figs. 9, 10 and 11. Therein I have shown a construction wherein the gear ring or part corresponding with the azimuth ring may be held fixed or in which the disk and the gyroscope may both be moved with respect thereto. In said figure, I have represented the gyroscope at 174, the outer gimbal ring thereof being provided with a spindle 175 mounted in the frame 176 of the torpedo and having fast thereon a disk 177 corresponding to the disk 159 shown in Fig. 12. With said disk cooperates a pawl 178 similar in function and mode of operation to the pawl 164 and carried by a suitable valve diagrammatically indicated at 179. In this form of my invention, the gyroscope 174 and the disk 177 fast therewith are oriented by the sighting means in a manner analogous to certain forms of my invention shown in my co-pending application Serial No. 50,718 and are freed in space when the torpedo is discharged.

In Figs. 15, 16 and 17 there is shown a form of step-by-step transmitting and repeating mechanism for automatically causing adjustment of the torpedo carrier or other directing means or direction-maintaining means therefor in accord with the orientation of the periscope or other instrumentality.

This mechanism comprises in this embodiment of the invention a contact arm 180 (Fig. 15) adapted to move with the periscope or other sighting instrumentality and engage either a contact segment 181 or a contact segment 182 separated by insulation pieces 183 and mounted on a face of an azimuth ring 184 concentric with the axis of said arm 180.

A gear 186 is also mounted on the circumference of the azimuth ring 184 and meshes with a pinion 187 fast on a countershaft 188 and with a pinion 189 fast on a counter-shaft 190.

A ratchet-wheel 191 may be mounted fast on the counter-shaft 188 and be advanced step-by-step by a pawl 192. A ratchet-wheel 193 may be mounted on the counter-shaft 190 and be advanced step-by-step by a pawl 194.

The pawl 192 may be connected to a step-by-step mechanism for reciprocating the same and causing the azimuth ring 184 to turn in a clockwise direction. The pawl 194 may be connected to a similar step-by-step mechanism for reciprocating the same and causing said azimuth ring to turn in a contra-clockwise direction.

Any suitable part or mechanism, such for example as torpedo direction-maintaining means, or a torpedo carrier, may be connected to a gear 195 fast on a shaft 196 and meshing with a pinion 197 fast on a counter-shaft 198 and with a pinion 199 fast on a counter-shaft 200.

A ratchet-wheel 201 is mounted fast on the shaft 198 and is adapted to be advanced step-by-step by a pawl 202. A ratchet-wheel 203 is mounted fast on the counter-shaft 200 and is adapted to be advanced step-by-step by a pawl 204. A step-by-step mechanism may be provided for reciprocating the pawl 202 to turn the torpedo carrier in a clockwise direction, and a step-by-step mechanism may be provided for reciprocating the pawl 204 to turn the torpedo carrier in a contra-clockwise direction.

The mechanisms for reciprocating all of said pawls are similar and therefore a detailed description of one will suffice for all. An illustrative mechanism is shown in Figs. 16 and 17, comprising magnets 205 mounted upon a yoke 206. An armature 207 is secured to a rock shaft 208, and is normally drawn against a fixed adjustable stop pin 209 by a spring 210, so that its axis is oblique to the field of the magnet. The magnet pole pieces 211 are cut away as shown in Fig. 16 to allow the armature to swing in line with the field of the magnet when energized.

A mechanism such as described above may be provided for each of the ratchet-wheel-actuating pawls, and each pawl is connected to its motor by an arm 212 fast on the armature shaft 208.

When the magnets of the mechanism are energized on the completing of a circuit therefor, the armature 207 will swing in contra-clockwise direction (Fig. 16) and when said circuit is open, said armature is swung back by the spring 210. Therefore, each time the armature rocks, it will actuate the pawl connected thereto and advance its ratchet-wheel a step.

Referring now to Fig. 15, Tc designates the transmitter mechanism for imparting step-by-step clockwise rotation to the azimuth ring 184, and Tcc designates the transmitter mechanism for imparting contra-clockwise rotation to said ring. Rc designates a mechanism controlled by the transmitter mechanism Tc, for imparting clockwise movement to the shaft 196, and Rcc designates a mechanism controlled by the transmitter mechanism Tcc for imparting contra-clockwise rotation to the shaft 196.

Each of the mechanisms previously referred to may be provided with a disc 213 (Figs. 16 and 17) pivoted on a shaft at one side of the armature shaft and having a bridge contact 214 on a face thereof adapted to connect with and disconnect from fixed contacts to be described. A similar disc 215 is mounted on a shaft on the opposite side of the armature shaft and has a bridge contact 216 on a face thereof adapted to connect and disconnect from fixed contacts to be described. The disc 213 may be rocked by a pin 217 projecting from the pawl actuating arm 212 referred to, into a radial slot 218 in said disc. The disc 215 may be rocked by a pin 219 projecting from said pawl actuating arm into a radial slot 220 in said disc.

Next will be described the electrical circuits and connections cooperating with the bridge contacts for the mechanisms for automatically transmitting step-by-step movements from the transmitting mechanisms to the repeating mechanisms.

$P_1$ (Fig. 15) designates a conductor which may be connected with any suitable source of electricity. This conductor is connected by a conductor $a$ which is connected in turn to branch wires one of which $a'$ is connected to a fixed contact 221 adapted to be connected to a fixed contact 222 by a bridge contact 223 on an armature 224 cooperating with a relay magnet 225 adapted to be energized as more fully hereinafter described. The fixed contact 222 is connected by a conductor $a^2$ with the switch arm 180 referred to as movable with the periscope. The contact segment 181 is connected by a conductor $a^3$ with one of the coils of the transmitter motor Tc, said coil being connected by a conductor $a^4$ with the other coil for said mechanism. The latter coil is connected by a conductor $a^5$ with a fixed contact 226 at the transmitter mechanism Tcc, said contact being adapted to be connected by a bridge contact 227 controlled by said mechanism, with a fixed contact 228. This contact is connected by a conductor $a^6$ with a fixed contact 229 at the repeater mechanism Rc, said fixed contact being adapted to be connected by a bridge contact 230 with a fixed contact 231 at said mechanism. This fixed contact is connected by a conductor $a^7$ with a fixed contact 232 at the repeater mechanism Rcc, said fixed contact being adapted to be connected by a bridge contact 233 with a fixed contact 234 at said mechanism. This fixed contact is connected by a conductor $a^8$ with a main negative conductor N.

When the contact arm 180 referred to, is turned to the right (Fig. 15) it will connect with the contact segment 181 and through the connections described complete the circuit to the field coils of the transmitter mechanism Tc, thereby energizing said mechanism and causing its armature to rock and through the pawl 192 and ratchet wheel 191 described turn the azimuth ring 184 a step in a clockwise direction.

Next will be described a circuit controlled by the rocking of the armature for the transmitter mechanism Tc, for energizing the field coils of the repeater mechanism Rc. This circuit comprises a fixed contact 235 located at the mechanism Tc and connected to the conductor $a'$ referred to, leading from the main conductor P. Said fixed contact 235 is adapted to be connected by a bridge contact 236 with a fixed contact 237 connected to a conductor $b$ leading to one of the field coils of the repeater mechanism Rc, said coil being connected by a conductor $b'$ to the other field coil of said mechanism, the latter coil being connected by a conductor $b^2$ with the main negative line N.

When the field coils of the transmitter mechanism Tc are energized as described, its armature will rock and shift the bridge contact 236 and cause the same to connect the fixed contacts 235 and 237, thereby completing the circuit to the field coils of the repeater mechanism Rc. This will cause the armature of said mechanism to rock and through the pawl 202 and ratchet wheel 201 described, turn the shaft 196 a step in a clockwise direction. Thus a rotative step of the azimuth ring 184 produced by the transmitter mechanism Tc is accompanied by a rotative step of the shaft 196 produced by the repeater mechanism Rc.

To make certain the armature of the transmitter mechanism Tc is held in position to complete the circuit to the repeater mechanism Rc until the armature of the latter has been rocked to complete the step movement of said mechanism, a holding circuit for the transmitter mechanism Tc is provided comprising a conductor $c$ tapped from the positive wire $a'$ referred to, and connected to a fixed contact 238 at the transmitter mechanism Tc, said fixed contact being adapted to be connected by a bridge contact 239 with a fixed contact 240 at said mechanism. This fixed contact is connected by a conductor $c'$ with one of the coils of said transmitter mechanism Tc. When the coils of said mechanism are energized the bridge contact 239 connects the fixed contacts 238 and 240 and completes the circuit to the coils of said transmitter mechanism Tc independently of the connections through the relay switch and the contact arm 180 which is moved in unison with the periscope. Thus the holding circuit insures the completing of a step movement of the transmitter mechanism once initiated, and the imparting of the step movement from said mechanism to the repeater mechanism Rc independently of any subsequent movement of the contact arm 180 and relay switch 223.

As the armature of the repeater mechanism Rc approaches the limit of its rocking movement its bridge contact 230 disconnects from the fixed contacts 229 and 231 thereby breaking the circuit to the field coils of the transmitter mechanism Tc and deenergizing the same. The armature is now drawn sharply back by its spring and shifts the bridge contact 236, breaking the circuit at the transmitter mechanism Tc to the field coils of the repeater mechanism Rc and shifting the bridge contact 239 at the transmitter mechanism Tc to break the holding circuit for said mechanism.

If the contact arm 180 is still in engagement with the contact segment 181, the transmitter mechanism Tc will make another step which will be repeated at the repeater mechanism Rc in a manner similar to that just described. Thus the transmitter mechanism and repeater mechanism will continue to advance step-by-step until the azimuth ring has rotated around so that an insulation piece 183 on said ring is in registration with the arm 180. This will automatically arrest the step movements of said mechanism.

To prevent the contact arm 180 from being effective to initiate a step prior to the completion of a step, there is provided a circuit connecting the relay referred to with the repeater mechanism Rc. This circuit comprises a conductor $d$ connecting the contact 221 at the relay with the magnet coil 225 of said relay, said coil being connected by a conductor $d'$ with a fixed contact 241 at the repeater mechanism Rc, said fixed contact being adapted to be connected by a bridge contact 242 with a fixed contact 243. This fixed contact is connected by a conductor $d^2$ with the wire $b^2$ leading to the main negative line N. When the field coils of the repeater mechanism Rc are energized, the armature of said mechanism on approaching the completion of its rocking movement will cause the bridge contact 242 to connect the fixed contacts 241 and 243 and complete the circuit described to the relay magnet, thereby energizing the latter and causing the same to attract its armature 224 and shift the bridge contact 223 to cut off the contact arm 180 from the main positive line. As a result, said arm if moved into engagement with the contact segment 181 or 182 would be ineffective to initiate a step until the previous step had been completed and the bridge contact 242 at the repeater mechanism Rc had been shifted to open the circuit to said relay. A spring 244 connected to said relay armature 224 then becomes effective to shift said bridge contact 223 back into engagement with the fixed contacts 221 and 222 and completes the connection of the positive line with the actuating contact arm 180. Then the latter may become effective to initiate another step movement of the mechanisms.

It will be observed that the conductors in the circuit for energizing the coils of the transmitter mechanism Tc, are connected by bridge contacts 227 and 233 respectively at the contra-clockwise transmitter mechanism Tcc and the contra-clockwise repeater mechanism Rcc. These bridge contacts will not be effective to complete the circuit to the transmitter mechanism Tc unless the contra-clockwise mechanisms are inoperative. Thus the circuit is arranged to prevent simultaneous operation of the clockwise and contra-clockwise mechanisms.

When the periscope or other sighting instrumentality is turned to shift the contact arm 180 in a contra-clockwise direction, it will connect with the contact segment 182 and will cause the contra-clockwise transmitter mechanism Tcc to impart contra-clockwise step movements to the contra-clockwise repeater mechanism Rcc by circuits and electrical connections similar to those described for the clockwise mechanism.

By the above described apparatus the movements may be imparted to the shaft 196 to cause the same to faithfully follow and simulate the orientation of the periscope or other sighting instrumentality.

The electrical connections permit the torpedo carrier to be located at any point desired and obviously any number of carriers may be controlled.

While I have described in detail one form of transmitting mechanism, and one form of repeating mechanism which may be employed in the practice of my invention, I am in no wise limited thereto. I may use any suitable forms or types of transmitting and repeating mechanisms. For example, I may employ the forms thereof disclosed in my co-pending application Serial No. 50,718.

Having thus described one illustrative embodiment of my invention, I desire it to be understood that, although specific terms are employed, they are used in a generic and descriptive sense, and not for purposes of limitation, the scope of the invention being set forth in the following claims:

Claims:

1. An apparatus for controlling torpedo firing comprising sighting means, a torpedo carrier mounted independently thereof, and operative connections between said sighting means and said torpedo carrier and including an azimuth ring, whereby the movements of the latter are controlled by said sighting means.

2. An apparatus for controlling torpedo firing comprising sighting means, a torpedo carrier, and synchronizing connections therebetween including an azimuth ring.

3. An apparatus for controlling torpedo firing comprising sighting means, a torpedo carrier, and synchronizing connections therebetween including an azimuth ring and a contact arm.

4. An apparatus for controlling torpedo firing comprising sighting means, a torpedo carrier, and synchronizing connections therebetween including an azimuth ring, a contact arm, and a motor controlled thereby.

5. An apparatus for controlling torpedo firing comprising sighting means, a torpedo carrier, means to synchronize the movements of said sighting means and said torpedo carrier, a torpedo having direction-maintaining means, and dial controlled means to adjust said direction-maintaining means.

6. An apparatus for controlling torpedo firing comprising sighting means, a plurality of torpedo carriers, means to synchronize the movements of said sighting means and a torpedo carrier, and means to effect convergence or divergence of the paths of travel of torpedoes discharged from a plurality of said torpedo carriers.

7. An apparatus for controlling torpedo firing comprising sighting means, a torpedo carrier support having three torpedo carriers, means to synchronize the movements of said sighting means and said support, and means to effect convergence or divergence of the paths of travel of the torpedoes discharged from two of said carriers.

8. An apparatus for controlling torpedo firing comprising sighting means, torpedo-direction imposing means, and operative connections between said means including step-by-step transmitting and repeating mechanism.

9. An apparatus for controlling torpedo firing comprising sighting means, torpedo-direction imposing means, and means for automatically imposing movements upon the latter synchronizing with those of the former, including step-by-step transmitting and repeating mechanism.

10. An apparatus for controlling torpedo firing comprising sighting means, torpedo-direction imposing means, and means for automatically imposing movements upon the latter synchronizing with those of the former, including a step-by-step transmitting mechanism, a step-by-step repeating mechanism, and electrical connections between said mechanisms.

11. An apparatus for controlling torpedo firing comprising sighting means, a torpedo carrier, and operative connections between said means including step-by-step transmitting and repeating mechanism.

12. An apparatus for controlling torpedo firing comprising sighting means, a torpedo carrier, and means for automatically imposing movements upon the carrier synchronizing with those of the sighting means, including step-by-step transmitting and repeating means.

13. An apparatus for controlling torpedo firing comprising sighting means, a torpedo carrier, and means for automatically imposing movements upon the carrier synchronizing with those of the sighting means, including a step-by-step transmitting mechanism, a step-by-step repeating mechanism and electrical connections between said mechanisms.

14. An apparatus for controlling torpedo firing comprising sighting means, a torpedo carrier, direction-maintaining means and means controlled by the sighting means and acting through said direction-maintaining means to move said torpedo carrier.

15. An apparatus for controlling torpedo firing, comprising sighting means, a torpedo carrier, direction-maintaining means, and means coacting with said sighting means and controlled thereby to move said torpedo carrier.

16. An apparatus for controlling torpedo firing, comprising sighting means, a torpedo carrier, an azimuth ring, and means cooperating therewith and controlled by the sighting means to move said torpedo carrier.

17. An apparatus for controlling torpedo firing, comprising sighting means, a torpedo carrier, and synchronizing connections between said sighting means and said torpedo carrier and including a transmitter, a repeater and an azimuth ring.

18. An apparatus for controlling torpedo firing, comprising sighting means, a torpedo carrier, and synchronizing connections between said sighting means and said torpedo carrier, and including an azimuth ring and a motor controlled in action by said sighting means.

19. An apparatus for controlling torpedo firing comprising sighting means, a movable torpedo carrier mounted independently thereof, an azimuth ring synchronized in movement with the sighting means, and a contact arm carried by the torpedo carrier and co-acting with said azimuth ring.

20. An apparatus for controlling torpedo firing comprising sighting means, a plurality of torpedo carriers, means to synchronize the movements of said carriers and said sighting means, and cooperating means to vary the movement of said carriers from that which would otherwise be imposed by the synchronizing means.

In testimony whereof, I have signed my name to this specification, in the presence of two subscribing witnesses.

JOHN HAYS HAMMOND, Jr.

Witnesses:
EVERETT S. EMERY,
IRVING W. TOWNSEND.